(12) United States Patent
Sakakibara et al.

(10) Patent No.: US 8,788,093 B2
(45) Date of Patent: Jul. 22, 2014

(54) HUMAN ROBOT INTERACTIVE SYSTEM (75) Inventors: Shinsuke Sakakibara, Minamitsuru-gun (JP); Masahiro Morioka, Minamitsuru-gun (JP); Satoshi Adachi, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 83 days.

(21) Appl. No.: 13/185,667

(22) Filed: Jul. 19, 2011

(65) Prior Publication Data

US 2012/0043831 A1 Feb. 23, 2012

(30) Foreign Application Priority Data

Aug. 17, 2010 (JP) ................................. 2010-182314

(51) Int. Cl.
*G06F 19/00* (2011.01)
*G05B 19/04* (2006.01)
*G05B 19/18* (2006.01)
*H02H 11/00* (2006.01)

(52) U.S. Cl.
USPC ............................ 700/245; 700/255; 307/326

(58) Field of Classification Search
USPC ............................ 700/245, 255, 260; 307/326
See application file for complete search history.

(56) References Cited

U.S. PATENT DOCUMENTS

| 6,459,956 | B2* | 10/2002 | Matsumoto | 700/245 |
| 2008/0161970 | A1* | 7/2008 | Adachi et al. | 700/253 |
| 2009/0018700 | A1* | 1/2009 | Okamoto et al. | 700/260 |
| 2010/0152896 | A1* | 6/2010 | Komatsu et al. | 700/258 |
| 2010/0191372 | A1* | 7/2010 | Nihei et al. | 700/245 |

FOREIGN PATENT DOCUMENTS

| DE | 20209680 | | 9/2002 |
| DE | 10391972 | | 1/2005 |
| DE | 102007037404 | | 2/2009 |
| JP | U-H06-33210 | | 4/1994 |
| JP | 06-218678 | | 8/1994 |
| JP | 11-267994 | | 10/1999 |
| JP | 11267994 | A * | 10/1999 |
| JP | 3099067 | | 8/2000 |
| JP | 4168441 | | 8/2008 |
| JP | 2008-213119 | | 9/2008 |
| JP | 2009-34755 | | 2/2009 |
| JP | 2010-155310 | | 7/2010 |
| JP | 2010155310 | A * | 7/2010 |
| WO | WO-03/072975 | | 9/2003 |

OTHER PUBLICATIONS

English machine translation Ryokichi (JP 11-267994).*

* cited by examiner

*Primary Examiner* — Rexford Barnie
*Assistant Examiner* — Rasem Mourad
(74) *Attorney, Agent, or Firm* — Drinker Biddle & Reath LLP (57) ABSTRACT

A human-robot interactive system in which a robot and a human share an area for performing interactive work, the human-robot interactive system including a force sensor which is set at an end effector attached to a front end of the robot or which is set at the robot and, when a detected value of the force sensor exceeds a predetermined value, is configured to stop the robot or controlling operation of the robot so that a detected value of the force sensor becomes smaller, the system further including a limiter which limits a work area of said human so as to prevent contact by the human with the first robot portion of the robot that is positioned further from the human than a set position of the force sensor during operation even when the robot approaches the human.

13 Claims, 11 Drawing Sheets

HUMAN ROBOT INTERACTIVE SYSTEM

RELATED APPLICATION DATA

This application claims priority under 35 U.S.C. §119 and/or §365 to Japanese Application No. 2010-182314 filed Aug. 17, 2010, the entire contents of which is incorporated herein by reference.

BACKGROUND OF THE INVENTION

1. Field of the Invention

The present invention relates to a human-robot interactive system wherein a robot and a human simultaneously share a same work space to perform interactive work.

2. Description of the Related Art

In recent years, human-robot interactive systems have been developed in which humans and robots are stationed mixed together on the production floor and production work is divided and performed split between the humans and robots. Such human-robot interactive systems are expected to reduce running costs in production and to improve production efficiency.

However, in a human-robot interactive system, there are dangers such as a robot striking a human or fingers of a human being caught between the arms of a robot. In particular, when a robot can operate at a high speed or when the power of a robot is large, a human may receive excessive force from the robot. Therefore, safety measures against such dangers are sought for a human-robot interactive system.

A conventional robot system is provided with a collision detection function which detects collision of a robot with its surroundings based on abnormal torque generated at the manipulator part of the robot. If collision is detected by this collision detection function, control is performed to stop the operation of the robot or otherwise lighten the collision force. Due to this, the damage to the robot and the devices provided at the robot as well as surrounding equipment is kept to a minimum.

However, when using a collision detection function for detecting collision between a human and a robot, it is necessary to raise the sensitivity to collision in order to ensure safety of the human. For this reason, it is sought to precisely estimate the frictional torque of the gears or speed reducers etc. provided at the different parts of a robot. In this regard, the frictional torque fluctuates depending on the outside air temperature and the operating state of the robot, so estimating the frictional torque with a high precision is difficult. Therefore, it was difficult to precisely detect collision between a human and a robot from the torques of the manipulator part of a robot and prevent harm to the human.

Further, Japanese Patent No. 3099067, Japanese Patent No. 4168441, Japanese Patent Publication (A) No. 2008-213119, and Japanese Patent Publication (A) No. 2009-34755 disclose a conveyance robot which conveys an object. Such conveyance work is interactive work where a human and a robot pick up the two sides of a carried object when conveying a carried object with large dimensions or a heavy carried object. Further, the force sensor which is provided between the robot and the carried object detects the direction of the force which the human performing the interactive work applies and has the robot assist conveyance in that direction. The art which is disclosed in Japanese Patent No. 3099067, Japanese Patent No. 4168441, Japanese Patent Publication (A) No. 2008-213119, and Japanese Patent Publication (A) No. 2009-34755 detects the force generated through a carried object between a human and a robot and enables control of the robot so that the generated force does not exceed a predetermined value.

However when a human directly contacts a robot without a carried object interposed between them, the force which occurs between the human and the robot is not detected. Further, even if attaching a force sensor for detecting force between the arm and hand of a robot etc., it is not possible to detect contact of the human at the arm portion of the robot which the sensor cannot detect. For this reason, in the prior art, it was not possible to provide a robot system which enabled safe interactive work when there was a possibility of a human and a robot coming into direct contact.

The present invention was made in consideration of this problem and has as its object the provision of a human-robot interactive system which can ensure safety of a human even in an environment in which a human and a robot can contact each other.

SUMMARY OF THE INVENTION

To achieve the above object, according to a first aspect, there is provided a human-robot interactive system wherein a robot and a human share an area for performing interactive work, the human-robot interactive system characterized by being provided with a force sensor which is set at an end effector attached to a front end of the robot or which is set at the robot and, when a detected value of the force sensor exceeds a predetermined value, stopping the robot or controlling operation of the robot so that a detected value of the force sensor becomes smaller, wherein the robot includes a first robot portion which is positioned further from the human than a set position of the force sensor and a second robot portion which is positioned closer to the human than the set position of the force sensor, and, wherein the human-robot interactive system is provided with a limiter which limits a work area of the human so as to prevent contact by the human with the first robot portion of the robot during operation even when the robot most approaches the human.

According to a second aspect, there is provided the first aspect wherein the force sensor is set between the robot and the end effector.

According to a third aspect, there is provided the first aspect wherein the robot includes a pedestal and an end effector mount for attaching the end effector and wherein the force sensor is set between the end effector mount and the pedestal of the robot.

According to a fourth aspect, there is provided any of the first to the third aspects wherein the limiter is a safety fence which is formed with at least one opening through which the second robot portion can pass.

According to a fifth aspect, there is provided the fourth aspect wherein the safety fence is set at a position of the force sensor in a case where the robot most approaches the human or is set at the position closer to the human than a position of the force sensor.

According to a sixth aspect, there is provided any of the first to the third aspects wherein the limiter is an area sensor which detects when the human approaches the first robot portion and wherein a two-dimensional detection area of the area sensor is formed with at least one detection disabled region through which the second robot portion can pass.

According to a seventh aspect, there is provided the sixth aspect wherein the two-dimensional area of the area sensor is set at a position of the force sensor in a case where the robot most approaches the human or is set at a position closer to the human than the position of the force sensor.

According to an eighth aspect, there is provided any of the first to the third aspects wherein the limiter is set on the robot, the end effector, or the force sensor.

According to a ninth aspect, there is provided the eighth aspect wherein the limiter is a plate-shaped member.

According to a 10th aspect, there is provided the ninth aspect wherein the plate-shaped member is set at a set position of the force sensor or is set at a position closer to the human than the position of the force sensor.

According to an 11th aspect, there is provided the eighth aspect wherein the limiter is an area sensor which detects when the human approaches the first robot portion.

According to a 12th aspect, there is provided the 11th aspect wherein the area sensor is set at a set position of the force sensor or is set at a position closer to the human than the position of the force sensor.

BRIEF DESCRIPTION OF THE DRAWING

These and other objects, features and advantages of the present invention will be more apparent in light of the detailed description of exemplary embodiments thereof as illustrated by the drawings, wherein.

DETAILED DESCRIPTION

Below, embodiments of the present invention will be explained with reference to the attached drawings. In the following drawings, similar members are assigned similar reference notations. To facilitate understanding, these figures are suitably changed in scale.

Figure 1:
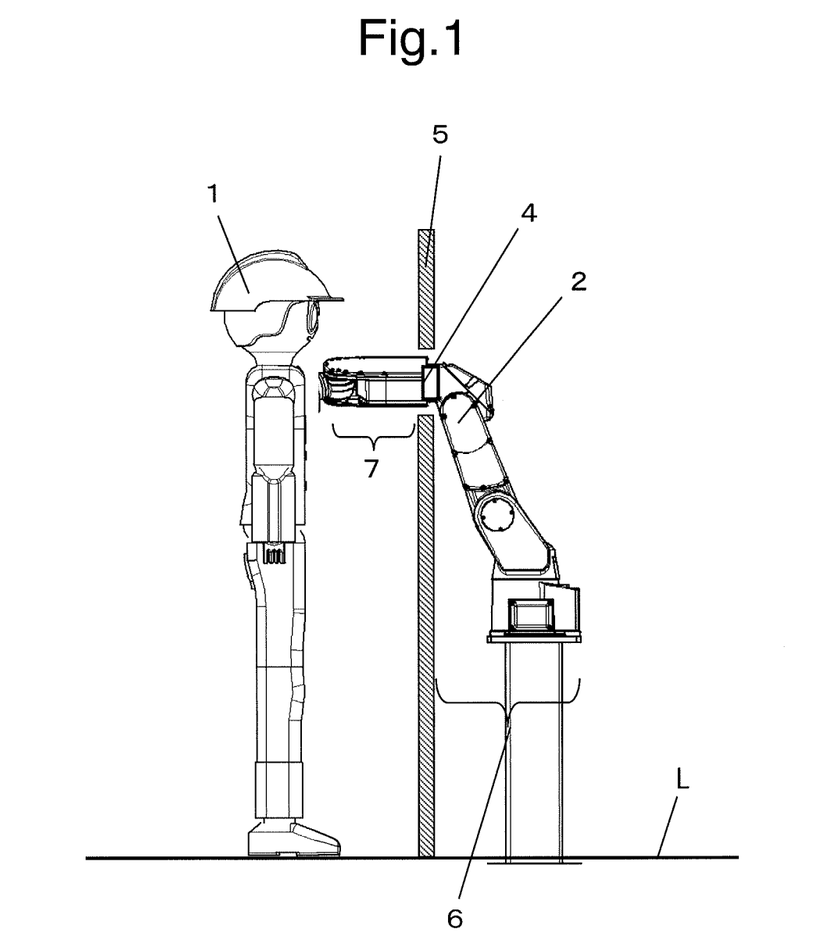
FIG. 1 is a side view of a human-robot interactive system in a first embodiment of the present invention.

FIG. 1 is a side view of a human-robot interactive system in a first embodiment of the present invention. In the human-robot interactive system shown in FIG. 1, a human 1 and a robot 2 are at positions close to each other for performing work in an interactive manner. In the embodiment shown in FIG. 1, the robot 2 is a vertical multi-articulated manipulator. Its pedestal is fastened to the floor L.

As shown in FIG. 1, part of the robot 2 is provided with a force sensor 4. The force sensor 4 is connected to a not shown control device. If the detected value of the force sensor 4 exceeds a predetermined threshold when the human 1 and robot 2 contact, the control device stops the robot 2 or operates the robot 2 so that the detected value of the force sensor 4 becomes smaller. By doing this, the force sensor 4 limits the application of excessive force by the robot 2 to the human 1.

Here, the portion of the robot 2 which is positioned further from the force sensor 4 which viewed from the human 1 is called the "first robot portion 6" while the portion of the robot 2 which is positioned closer to the human 1 than the force sensor 4 is called the "second robot portion 7". The second robot portion 7 is the portion limited by the force sensor 4 so that excessive force is not applied to the human 1 and therefore no harm is inflicted on the human 1.

As opposed to this, when the first robot portion 6 and the human 1 contact each other, the human 1 may receive excessive force from the first robot portion 6. In particular, when the robot 2 can operate at a high speed or when the power of the robot 2 is large, the human 1 can receive a further excessive force from the robot 2.

For this reason, in the present invention, a limiter which limits the work area of the human 1 is provided between the human 1 and the robot 2. Due to this limiter 5, the human 1 and the first robot portion 6 of the operating robot are prevented from contacting each other and the human 1 can only contact the second robot portion 7 not able to harm the human 1. Therefore, in the present invention, a limiter 5 which limits contact between the human 1 and the first robot portion 6 of the operating robot and a force sensor 4 designed so that the second robot portion 7 does not generate excessive force are used to enable a human 1 to perform safe interactive work with a robot 2 without receiving excessive generated force from any portion of the robot 2.

Figure 2:
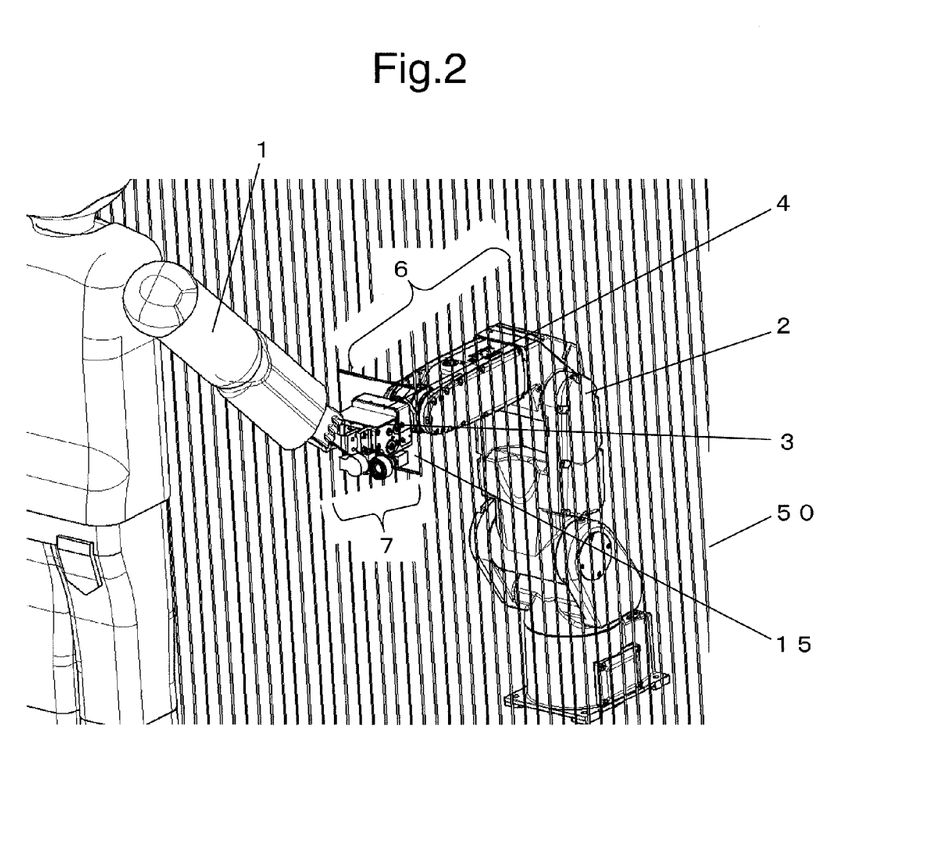
FIG. 2 is a partial perspective view of a human-robot interactive system in one embodiment.

The limiter 5 which limits contact between the human 1 and the first robot portion 6 of the operating robot can come in various forms. FIG. 2 is a partial perspective view of a human-robot interactive system in one embodiment. In FIG. 2, the limiter 5 is a safety fence 50.

As shown in FIG. 2, the robot 2 has an end effector 3 attached to it. The force sensor 4 is arranged between the robot 2 and the end effector 3. The end effector 3 is a device which is attached to the robot 2 to perform work. The end effector 3 has hand applications for gripping or otherwise handling a part, assembly applications for screwing, coating an adhesive, performing insertion work, or welding, auxiliary work applications for instructing work to humans 1 by a laser pointer or for auxiliary work for a human 1, tooling applications, etc.

In FIG. 2, the second robot portion 7 is the end effector 3, while the first robot portion 6 is the robot 2 body minus the end effector 3. The limiter 5 constituted by the safety fence 50 limits contact between the human 1 and the first robot portion 6. As illustrated, the safety fence 50 is formed with an opening 15. The opening 15 is of the minimum extent of dimensions enabling the human 1 and the second robot portion 7 to contact each other. The human 1 and the second robot portion 7 (end effector 3) contact each other through this opening 15. Further, the human 1 cannot pass through that opening 15 to contact the first robot portion 6.

In this way, since a force sensor 4 is set between the robot 2 and the end effector 3, when the human 1 and the robot 2 engage in interactive work, the second robot portion 7 constituted by the end effector 3 will not exert an excessive force on the human 1. Further, the limiter 5 constituted by the safety fence 50 is arranged, so the human 1 will never directly contact the first robot portion 6 at which he might receive excessive force. The human 1 can only contact the second robot portion 7 which passes through the opening 15, therefore can perform safe interactive work.

In actuality, when the human 1 and robot 2 are engaged in interactive work, often the only portion where there is a need for the human 1 and robot 2 to contact is the end effector 3. In the embodiment shown in FIG. 2, contact with the human 1 is limited to just the end effector 3, so safe interactive work can be performed with the minimum necessary extent of limitation.

Figure 3:
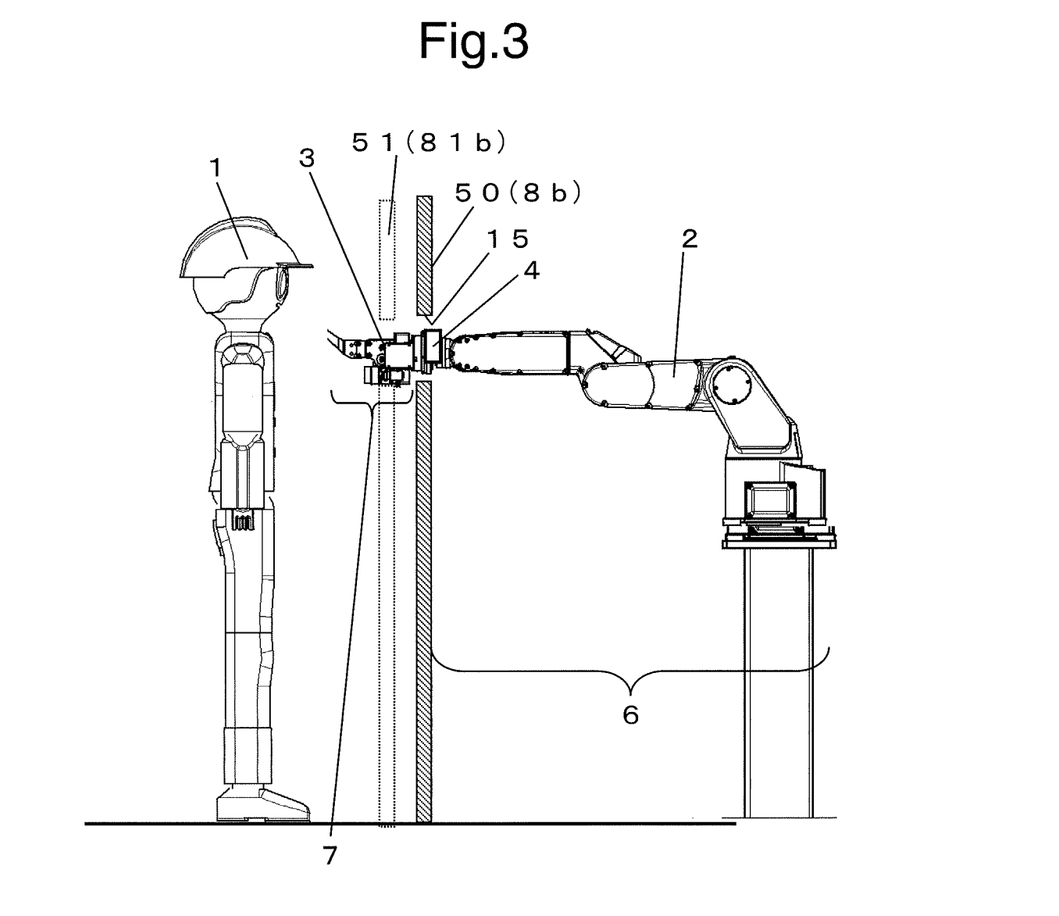
FIG. 3 is a side view of the human-robot interactive system shown in FIG. 2.

FIG. 3 is a side view of the human-robot interactive system shown in FIG. 2. In FIG. 3, the robot 2 extends its arm up to the limit in the horizontal direction. As a result, the end effector 3 which is attached to the front end of the arm passes over the opening 15 of the safety fence 50 and most approaches the human 1. As shown by the solid line in FIG. 3, the safety fence 50 is set at a position corresponding to the force sensor 4 of the robot 2 when the arm of the robot 2 extends in the horizontal direction. Further, the safety fence 51 shown by the broken lines in FIG. 3 is set at a position closer to the human than the position corresponding to the force sensor 4.

As shown by the solid line in FIG. 3, when the safety fence 50 is set at a position corresponding to the force sensor 4, the first robot portion 6 will never pass over the safety fence 5 and enter the work area of the human 1. Therefore, it is possible to completely prevent the human 1 and the first robot portion 6 from contacting each other.

Further, as shown by the broken line in FIG. 3, when the safety fence 51 is set at a position closer to the human 1 than the position corresponding to the force sensor 4, even if a problem with the robot 2 causes the robot 2 to approach the human by over the usual stroke, the position of the force sensor 4 will never exceed the safety fence 51. Therefore, even if a problem arises in the robot 2, contact between the human 1 and the first robot portion 6 can be avoided and safe interactive work can be performed.

Figure 4:
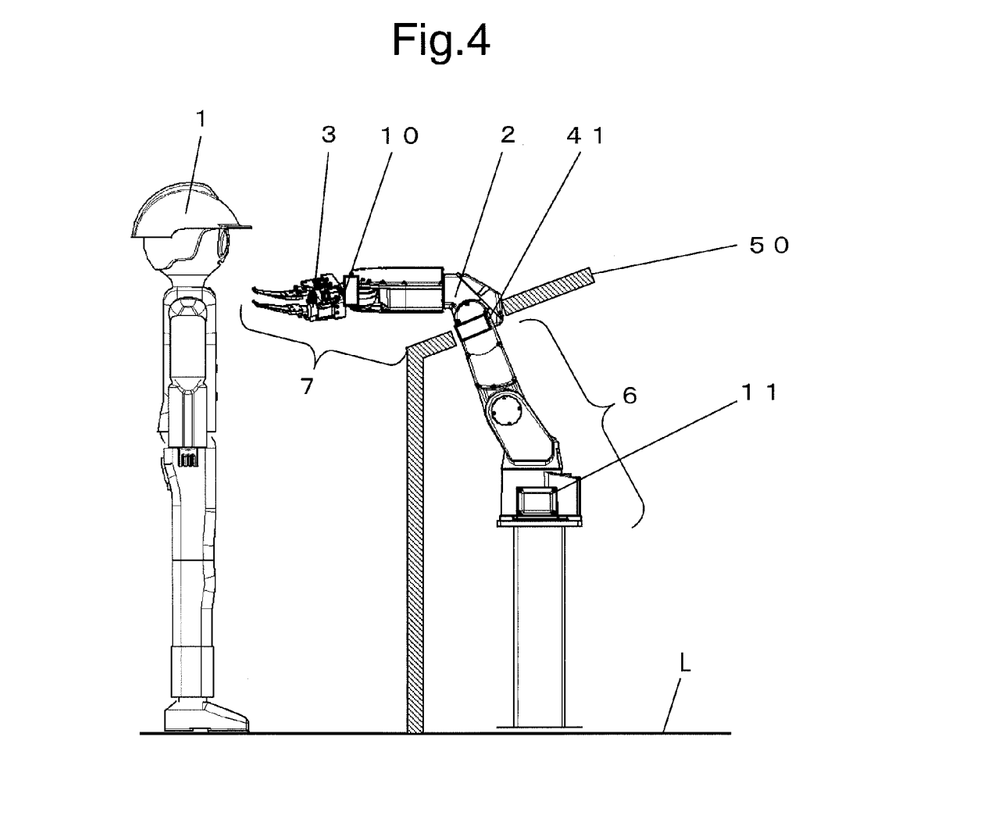
FIG. 4 is a side view of a human-robot interactive system in a second embodiment of the present invention.

FIG. 4 is a side view of a human-robot interactive system in a second embodiment of the present invention. In FIG. 4, the end effector 3 is attached to an end effector mount 10 provided at the front end of the robot 2. Further, the robot 2 is set on a pedestal 11 which is provided on a floor L. The force sensor 41 is arranged between the pedestal 11 and the end effector mount 10.

In FIG. 4, at least part of the safety fence 50 is made to tilt in a direction away from the human 1. For this reason, in the second embodiment, if compared with the case shown in FIG. 3, at least part of the safety fence 50 is positioned further from the human 1. As a result, in the second embodiment, it is possible to secure a broader work area of the human 1.

Figure 5:
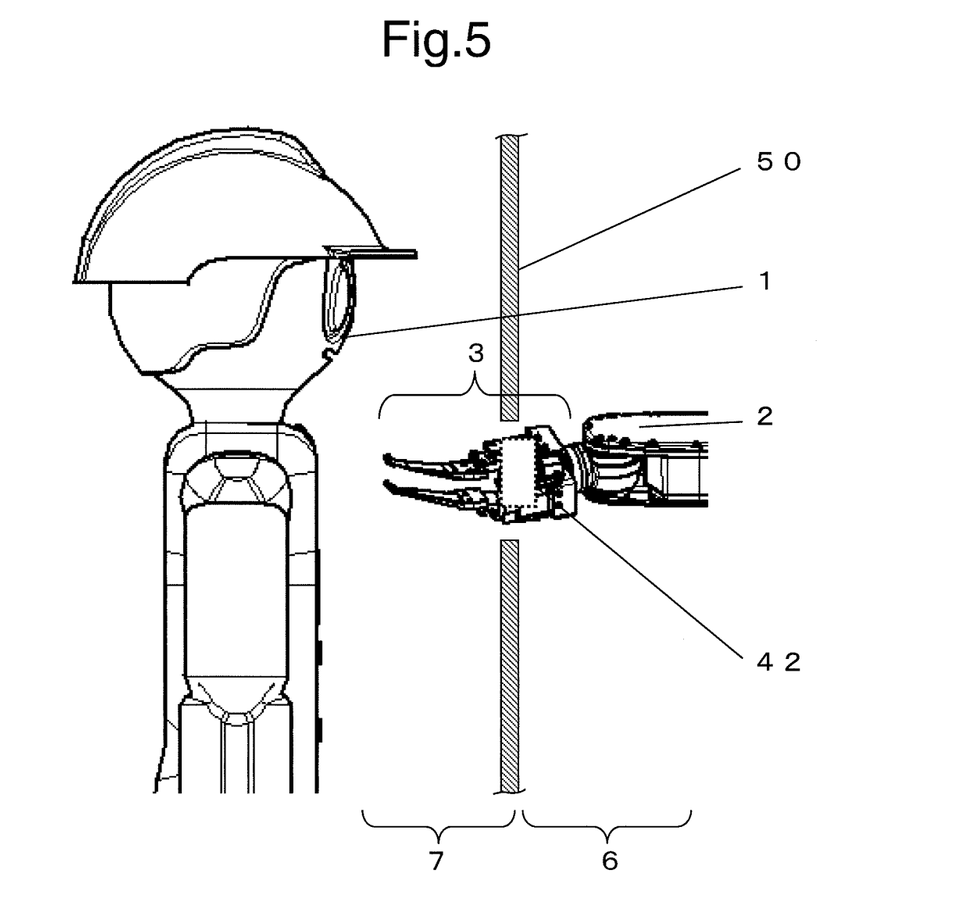
FIG. 5 is a side view of a human-robot interactive system in another embodiment.

FIG. 5 is a side view of a human-robot interactive system in another embodiment. In FIG. 5, the force sensor 42 is built in the end effector 3. The safety fence 50 in FIG. 5 is set at a position corresponding to the force sensor 42 when the robot 2 extends its arm up to the limit in the horizontal direction. For this reason, compared with the case where the force sensor 4 is set between the robot 2 and the end effector 3, it is possible to secure a larger area of the first robot portion 6. The operable range of the robot 2 becomes broader, so interactive work between the human 1 and robot 2 becomes possible without lowering the degrees of freedom of the robot operation.

Figure 6:
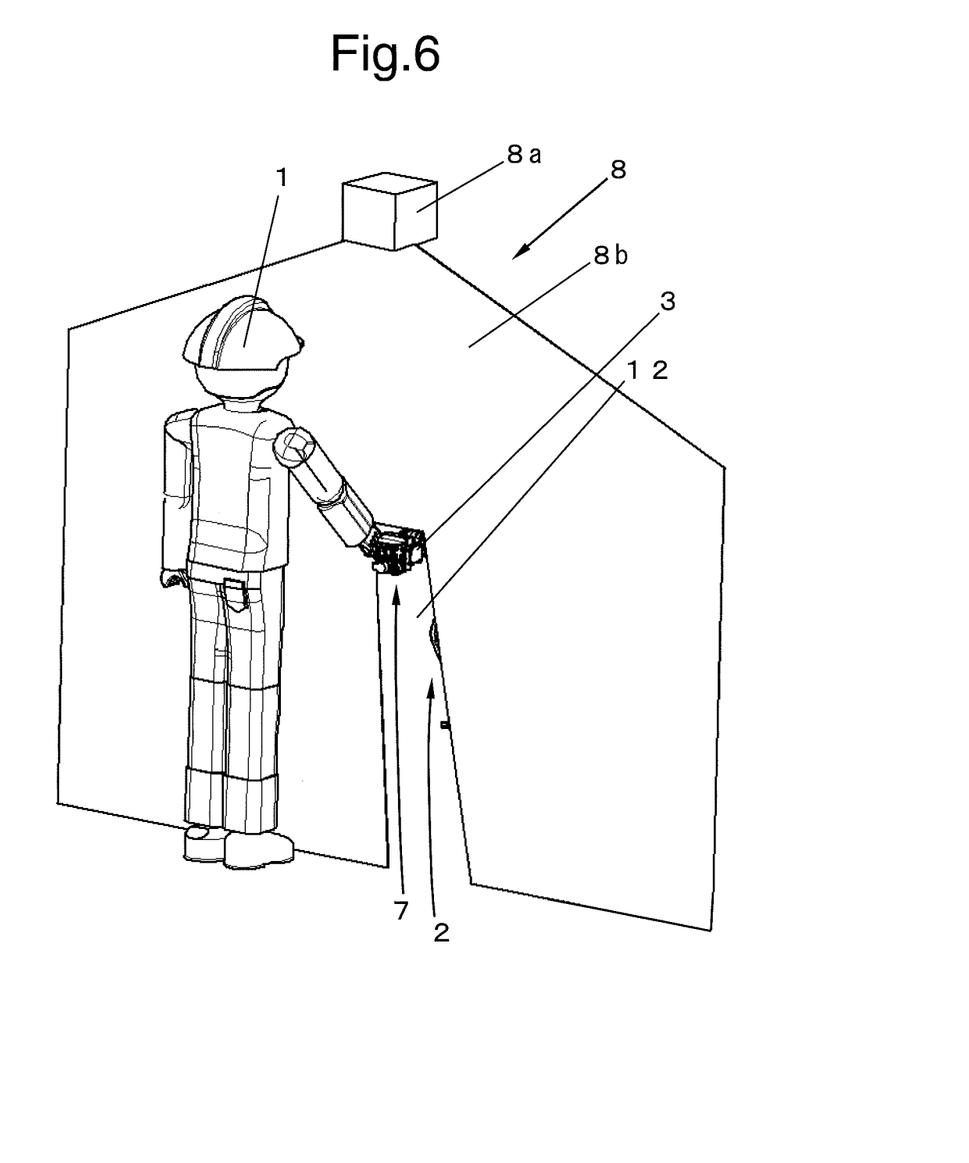
FIG. 6 is a perspective view of a human-robot interactive system in a third embodiment of the present invention.

FIG. 6 is a perspective view of a human-robot interactive system in a third embodiment of the present invention. In FIG. 6, instead of the safety fence 50, an area sensor 8 is placed as the limiter 5. The area sensor 8 for example is a laser scanner sensor which scans the area by a laser curtain or laser beam to detect an object and is provided with a sensor head 8a for firing a laser beam etc. and detecting entry of an object from its reflection and a two-dimensional detection area 8b which is formed by the sensor head 8a. The detection area 8b shown in FIG. 6 is a vertical surface which partitions off the human 1 and robot 2.

The sensor head 8a in FIG. 6 is set above the human 1 and robot 2. However, the sensor head 8a may also be set below and/or at the side of the human 1 and robot 2 in accordance with the surrounding environment etc. Furthermore, it is also possible to set a plurality of area sensors 8. In this case, it is possible to define finer detection areas.

As shown in FIG. 6, the detection area 8b includes the minimum necessary extent of detection disabled region 12. In such a detection disabled region 12, even if the human 1 and end effector 3 etc. of the robot 2 enter, this is made to not be detected by the sensor head 8a. In FIG. 6, a single detection disabled region 12 extends at the detection area 8b from a place corresponding to the end effector 3 of the robot 2 downward to the floor. However, the shape of the detection disabled region 12 is not limited to the content of FIG. 6. It is possible to employ all sorts of shapes of detection disabled region 12 through which the second robot portion 7 can pass.

In FIG. 6, the second robot portion 7, for example, the end effector 3, enters the work area of the human 1 through the detection disabled region 12 of the detection area 8b. Then, the human 1 can contact the second robot portion 7 to perform interactive work.

Further, it is also possible to employ an area sensor 8 which can freely set the detection area 8b. In this case, it is possible to freely change the detection area 8b and detection disabled region 12 for a surrounding environment which changes in accordance with the production line. In other words, it is possible to flexibly and dynamically set the detection disabled region 12 in accordance with the posture of the robot 2 and the nature of the interactive work.

Furthermore, by switching the detection disabled region 12 between the enabled/disabled states, it is also possible to change the setup so that the human 1 and the robot 2 temporarily work independently in separated areas. Furthermore, it is also possible to provide a camera (not shown) which monitors the positions of the human 1 or robot 2 or the end effector 3. It is possible to use this camera to monitor contact between the human 1 and first robot portion 6, so it is possible to use the camera in place of the limiter 5 or area sensor 8.

As can be seen by again referring to FIG. 3, it is also possible to set the area sensor 8 so that the detection area 8b of the area sensor 8 takes the place of the safety fence 50. Further, it is possible to set the area sensor 8 so that the detection area 81b of the area sensor 8 takes the place of the safety fence 51. If setting the area sensor 8 so that the detection area 81b takes the place of the safety fence 51, the detection area 81b becomes a position closer to the human 1 than the force sensor 4. Therefore, even if a detection delay arises in the detection area 81b or a problem occurs in the robot 2, it is possible to reliably prevent contact between the human 1 and the operating robot 2.

Figure 7:
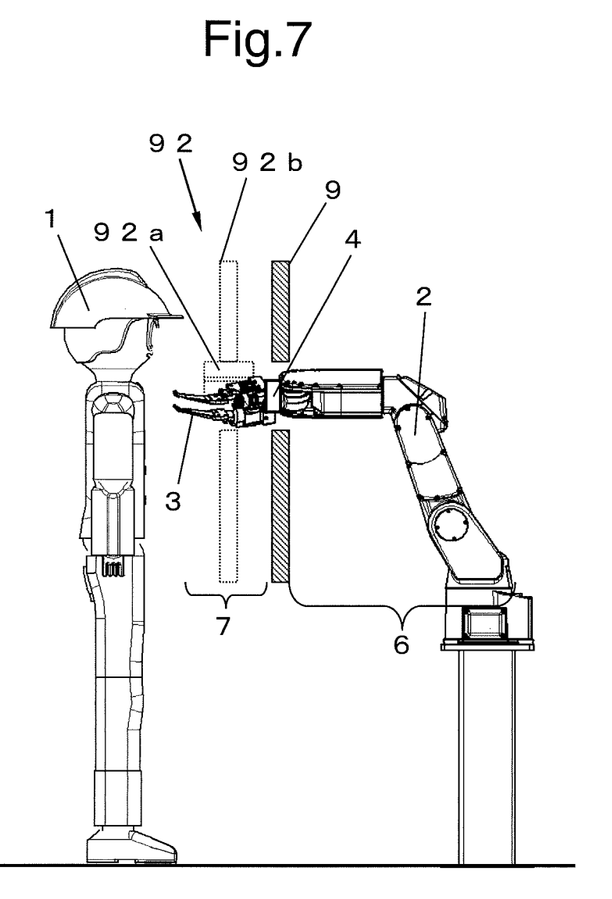
FIG. 7 is a side view of a human-robot interactive system in a fourth embodiment of the present invention.

FIG. 7 is a side view of a human-robot interactive system in a fourth embodiment of the present invention. In FIG. 7, as the limiter 5, a flange 9 is directly attached to a part of the robot 2. The flange 9 may also be attached to the end effector 3 and further may also be directly attached to the force sensor 4. Note that the force sensor 4 may be attached not only between the robot 2 and the end effector 3, but also to another location of the robot 2.

In the embodiment shown in FIG. 7, the flange 9 moves while following the movement of the robot 2. Therefore, regardless of the position and posture of the robot 2, it is possible to reliably prevent contact between the human 1 and the first robot portion 6 and, further, it is possible to increase the degrees of freedom of the robot system.

Furthermore, as shown in FIG. 7, when setting the flange 9 at the force sensor 4, it is possible to avoid a human 1 passing over the flange 9 and contacting the first robot portion 6. Further, when setting a similarly shaped flange 92b at a portion closer to the human 1 than the force sensor 4, for example, setting it at the end effector 3, it is possible to reliably avoid contact between the human 1 and the first robot portion 6.

Figure 8:
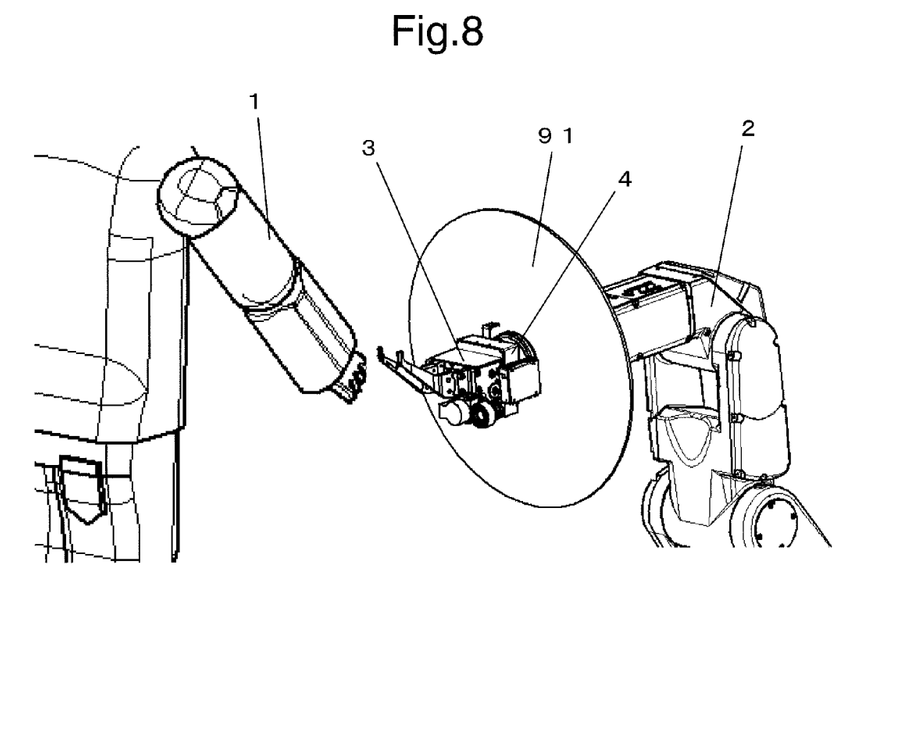
FIG. 8 is a partial perspective view of a human-robot interactive system in still another embodiment.

FIG. 8 is a partial perspective view of a human-robot interactive system in still another embodiment. In FIG. 8, as a specific example of a flange 9, a substantially circular plate-shaped member 91 is shown.

In this case, the plate-shaped member 91 enables the human 1 to be physically reliably separated from the first robot portion 6. The human 1 can only contact the second robot portion 7. As explained above, the second robot portion 7 is controlled by the force sensor 4 so as not to apply excessive force to the human 1. For this reason, the plate-shaped member 91 and the force sensor 4 enable the human 1 to safely perform interactive work with the robot 2.

As explained above, the plate-shaped member 91 may also be set on the end effector 3 so long as it can prevent contact between the human 1 and first robot portion 6. Further, it may be set on the force sensor 4. Furthermore, the force sensor 4 may be set at part of the robot 2. Further, it may be set inside of the end effector 3.

Figure 9:
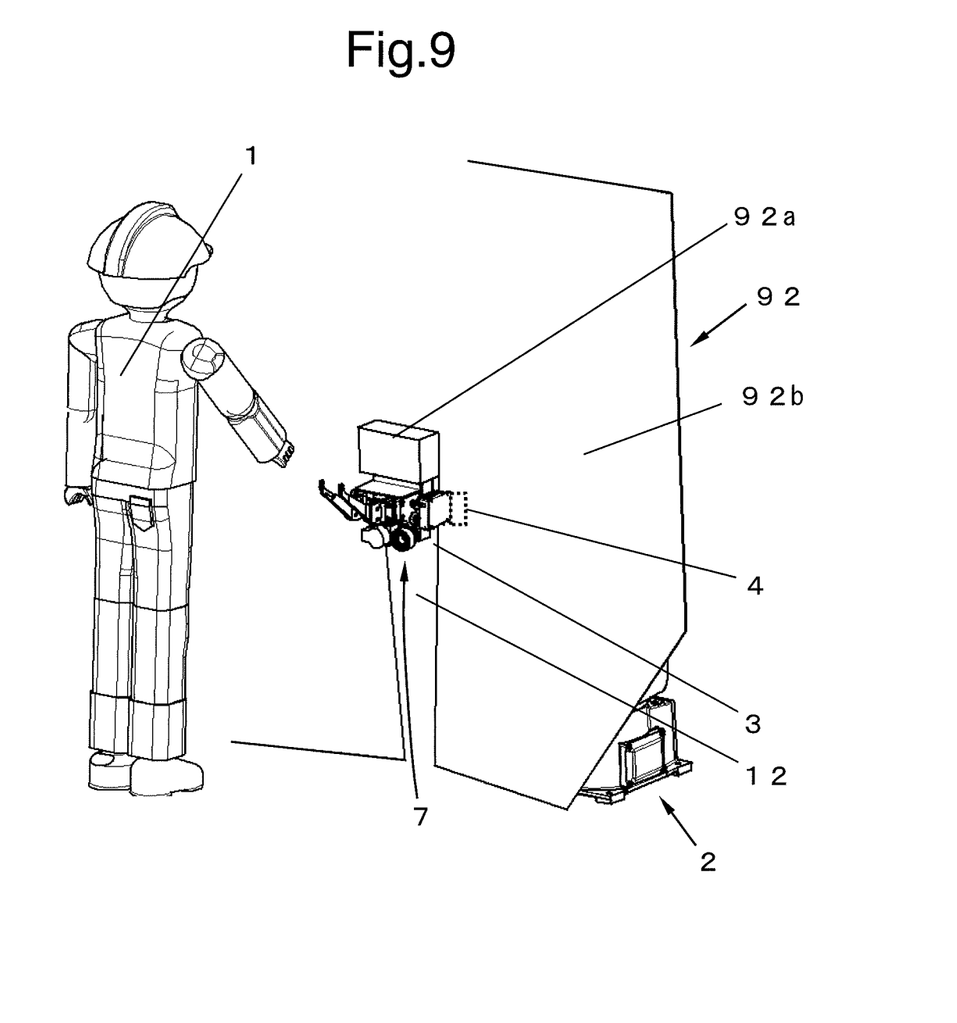
FIG. 9 is a perspective view of a human-robot interactive system in a fifth embodiment of the present invention.

FIG. 9 is a perspective view of a human-robot interactive system in a fifth embodiment of the present invention. In FIG. 9, the area sensor 92 performs the role as the limiter 5 to prevent a human 1 from contacting the first robot portion 6. Further, the area sensor 92 includes a sensor head 92a which is attached near the front end of the robot 2 and a two-dimensional detection area 92b which is formed by the sensor head 92a.

In the embodiment shown in FIG. 9, the sensor head 92a is provided on the force sensor 4 which is set between the robot 2 and the end effector 3. However, the sensor head 92a may also be set on the end effector 3 or may be set on another part of the robot 2. Furthermore, setting a plurality of sensor heads 92a to define finer detection areas 92b is also included in the scope of the present invention.

When a human 1 attempts to touch the first robot portion 6 (robot 2 body), the area sensor 92 detects that the human 1 and first robot portion 6 are approaching each other. Due to this, a control device (not shown) controls the robot 2 to stop or retract. Due to this, a human 1 will never contact and receive excessive force from the first robot portion 6.

Further, it is also possible to employ an area sensor 92 which can freely set a detection area 92b. In this case, it is possible to freely change the detection area 92b for a surrounding environment which changes in accordance with the production line.

As can be seen from again referring to FIG. 7, it is also possible to set the sensor head 92a at the end effector 3 so that the detection area 92b of the area sensor 92 takes the place of the flange 9. Further, it is also possible to set the sensor head 92a on the force sensor 4. When setting the sensor head 92a on the end effector 3, the detection area 92b becomes position closer to the human 1 than the force sensor 4. Therefore, even when a detection delay occurs in the detection area 92b or a problem occurs in the robot 2, it is possible to reliably prevent contact between the human 1 and the operating robot 2.

The robot 2 in the above embodiments is a vertical multi-articulated manipulator with a pedestal 11 fixed to the floor L. However, it is also possible to employ another type of robot 2, for example, a horizontal multi-articulated robot or a parallel link structure robot.

Figure 10:
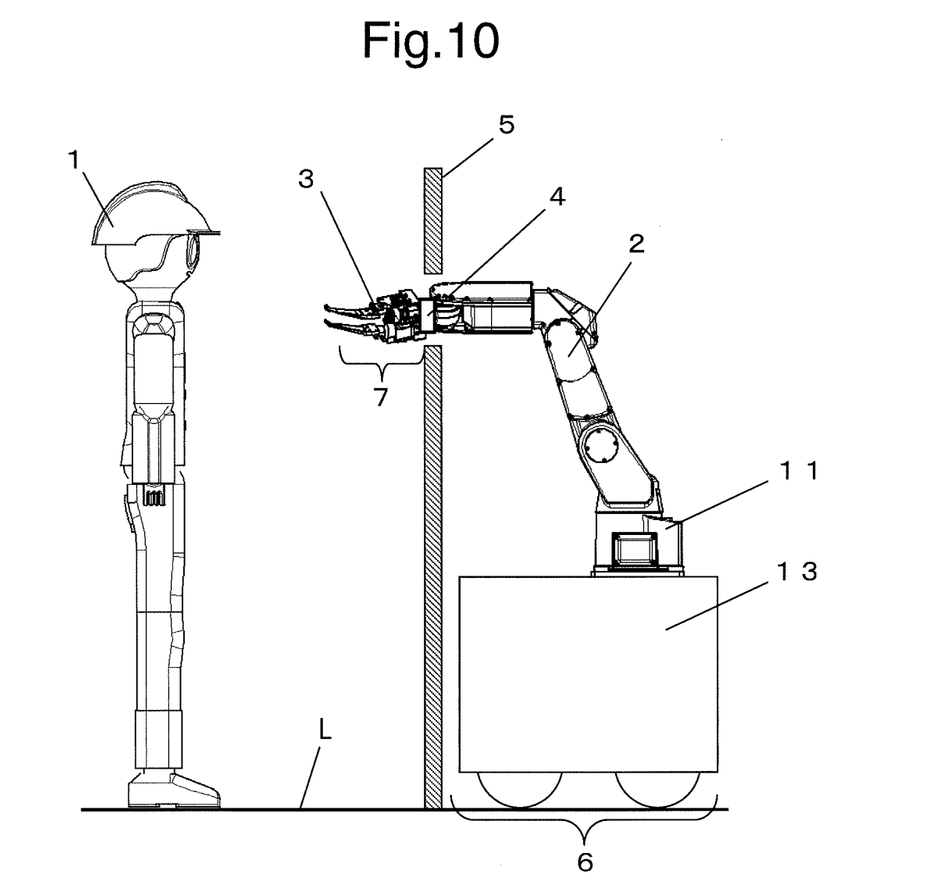
FIG. 10 is a side view of a human-robot interactive system in a sixth embodiment of the present invention.

FIG. 10 is a side view of a human-robot interactive system in a sixth embodiment of the present invention. The robot 2 in FIG. 10 has a pedestal 11 placed on a movable cart 13 able to slide over the floor L. In FIG. 10, when the force sensor 4 which is placed between the robot 2 and the end effector 3 detects excessive force or the limiter 5 detects that the human 1 has contacted the first robot portion 6, not only the arm of the robot 2, but also the cart 13 is controlled to stop or retract. Therefore, in the sixth embodiment as well, the human 1 and robot 2 can perform safe interactive work. Note that instead of the safety fence 5, it is also possible to employ a wall-like object and/or area sensor in the same way as above.

Figure 11:
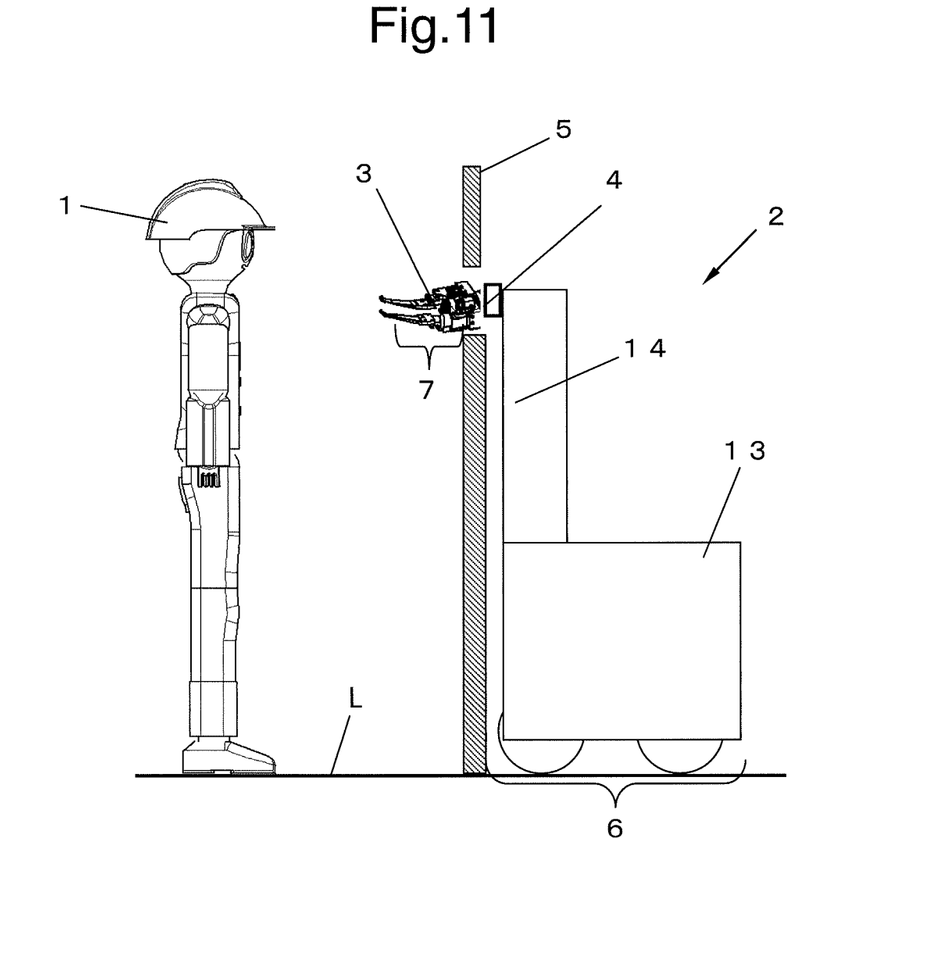
FIG. 11 is a view showing a modification of the human-robot interactive system which is shown in FIG. 10.

Furthermore, FIG. 11 is a view showing a modification of the human-robot interactive system shown in FIG. 10. As shown in FIG. 11, it is possible to employ a robot 2 including a movable cart 13 provided with an extension 14 which extends in the vertical direction instead of the arm of the robot 2. In this case, the end effector 3 is attached to the front end of the extension 14, while the force sensor 4 is arranged between the end effector 3 and the extension 14. In this case as well, similar effects as explained above area clearly obtained.

ADVANTAGEOUS EFFECTS OF INVENTION

In the first aspect of the invention, since a limiter is provided, a human can only contact a portion of a robot which is positioned closer to the human than a force sensor of the operating robot (second robot portion). Further, based on the control by the force sensor, when a human and the second robot portion contact, it is possible to avoid the human receiving excessive force from the robot and possible to avoid the human receiving excessive force from all sorts of portions of the robot. Therefore, even in an environment in which contact may occur between a human and a robot, it is possible to perform interactive work while ensuring the safety of the human.

In the second aspect of the invention, when setting the force sensor between the robot and the end effector, the body of the robot becomes the first robot portion while the end effector becomes the second robot portion. The human can only contact the end effector, so it is possible to perform interactive work while ensuring the safety of the human.

In the third aspect of the invention, when setting the force sensor between the end effector mount and the pedestal of the robot, the first robot portion is set at a location far from the human, so it is possible to set the limiter at a position far from the human. For this reason, it is possible to secure a broad work area for the human and possible to perform safe interactive work without detracting from the work efficiency of the human.

In the fourth aspect of the invention, a safety fence formed with an opening is used as the limiter. Therefore, a human can physically only contact the second robot portion. For this reason, it is possible to reliably separate the human from the first robot portion which could cause excessive force.

In the fifth aspect of the invention, when setting the safety fence at the position of the force sensor in the case where the robot most approaches the human, the human can be prevented from contacting the first robot portion. When setting the safety fence at a position closer the human than such a position of the force sensor, even if a problem causes the robot to approach the human side more than a predetermined position, a human contacting the first robot portion can be avoided.

In the sixth aspect of the invention, a human and robot can contact each other only through a detection disabled region of the detection area, so it is possible to reliably separate the area of the first robot portion of the robot and the area of the human. Further, when using an area sensor which can freely set a detection disabled region, the degrees of freedom of the interactive work can be improved by changing the location of the interactive work between the human and the robot or by changing the detection area so as not to interfere with the surrounding environment.

In the seventh aspect of the invention, when setting an area sensor at the position of the force sensor in the case where the robot most approaches the human, it is possible to prevent the first robot portion of the operating robot and a human from contact. When setting an area sensor at a position closer to the human than such a position of the force sensor, the human contacting the first robot portion of the operating robot can be avoided even when a problem results in the robot approaching the human side more than a predetermined position.

In the eighth aspect of the invention, by mounting the limiter on the robot, end effector, or the force sensor, it is possible to prevent the first robot portion of the operating robot and a human from contact regardless of the position and posture of the robot. As a result, it is possible to provide a human-robot interactive system with higher degrees of freedom.

In the ninth aspect of the invention, it is possible to physically reliably separate the area of the first robot portion and the area of the human.

In the 10th aspect of the invention, when setting a plate-shaped member at the force sensor, it is possible to prevent the first robot portion and the human from contact. When setting the plate-shaped member at a position closer to the human than the position of the force sensor, the human contacting the first robot portion can be avoided even when a problem results in the robot approaching the human side more than a predetermined position.

In the 11th aspect of the invention, an area sensor is used, so it is possible to easily optimize the detection area so that no interference occurs with the surrounding environment. Furthermore, it is possible to dynamically change the detection area in accordance with the robot operation and therefore improve the degrees of freedom of the human-robot interactive system.

In the 12th aspect of the invention, when setting an area sensor at the position of the force sensor, it is possible to prevent the first robot portion of the operating robot and a human from contact. When setting an area sensor at a position closer to the human than the position of the force sensor, the human contacting the first robot portion of the operating robot can be avoided even when a problem results in the robot approaching the human side more than a predetermined position.

Although the invention has been shown and described with exemplary embodiments thereof, it should be understood by those skilled in the art that the foregoing and various other changes, omissions and additions may be made therein and thereto without departing from the spirit and the scope of the invention.

The invention claimed is:

1. A human-robot interactive system wherein a robot and a human share an area for performing interactive work, said human-robot interactive system comprising:
a force sensor which is set at an end effector attached to a front end of said robot or which is set at said robot and, when a detected value of said force sensor exceeds a predetermined value, stopping said robot or controlling operation of said robot so that a detected value of said force sensor becomes smaller,
wherein said robot includes a first robot portion which is positioned further from said human than a set position of said force sensor and a second robot portion which is positioned closer to said human than said set position of the force sensor, and
wherein said human-robot interactive system is further provided with a limiter that is arranged in a plane which is located between the human and the first robot portion, the plane intersecting with a location of the force sensor of the robot when an arm of the robot is extended in a horizontal direction, which limits a work area of said human so as to prevent contact by said human with said first robot portion of said robot during operation even when said robot most approaches said human.

2. A human-robot interactive system as set forth in claim 1, wherein said force sensor is set between said robot and said end effector.

3. A human-robot interactive system as set forth in claim 1, wherein said robot includes a pedestal and an end effector mount for attaching said end effector and wherein said force sensor is set between said end effector mount and said pedestal of said robot.

4. A human-robot interactive system as set forth in claim 1, wherein said limiter is a safety fence which is formed with at least one opening through which said second robot portion can pass.

5. A human-robot interactive system as set forth in claim 4, wherein said safety fence is set at a position of said force sensor in a case where said robot most approaches said human or is set at the position closer to said human than a position of said force sensor.

6. A human-robot interactive system as set forth in claim 1, wherein said limiter is an area sensor which detects when said human approaches said first robot portion and wherein a two-dimensional detection area of said area sensor is formed with at least one detection disabled region through which said second robot portion can pass.

7. A human-robot interactive system as set forth in claim 6, wherein said two-dimensional area of said area sensor is set at a position of said force sensor in a case where said robot most approaches said human or is set at a position closer to said human than the position of said force sensor.

8. A human-robot interactive system as set forth in claim 1, wherein said limiter is set on said robot, said end effector, or said force sensor.

9. A human-robot interactive system as set forth in claim 8, wherein said limiter is a plate-shaped member.

10. A human-robot interactive system as set forth in claim 9, wherein said plate-shaped member is set at a set position of said force sensor or is set at a position closer to said human than the position of said force sensor.

11. A human-robot interactive system as set forth in claim 8, wherein said limiter is an area sensor which detects when said human approaches said first robot portion.

12. A human-robot interactive system as set forth in claim 11, wherein said area sensor is set at a set position of said force sensor or is set at a position closer to said human than the position of said force sensor.

13. A human-robot interactive system as set forth in claim 1, wherein said limiter is arranged such that a first area is arranged on a side of the plane that faces away from the human and a second area is arranged on a side of the plane that faces the human, the first robot portion arranged in the first area, and the second robot portion arranged in the second area, and
wherein an opening is arranged in the limiter through which said second robot portion passes and is configured to prevent the human from touching the first robot portion.

* * * * *